United States Patent [19]

Green

[11] 3,930,126

[45] Dec. 30, 1975

[54] TWO RELAY LINE CIRCUIT

[75] Inventor: John Hugh Green, Milan, Tenn.

[73] Assignee: International Telephone and Telegraph Corporation, New York, N.Y.

[22] Filed: Aug. 14, 1974

[21] Appl. No.: 497,301

[52] U.S. Cl. .................................. 179/19; 179/18 F

[51] Int. Cl.² .......................................... H04M 3/16

[58] Field of Search...... 179/19, 18 F, 18 FA, 18 G, 179/18 H

[56] References Cited

UNITED STATES PATENTS 3,156,777 11/1964 Horwitz et al.................... 179/18 F

*Primary Examiner*—Thomas A. Robinson

*Attorney, Agent, or Firm*—James B. Raden; Marvin M. Chaban

[57] ABSTRACT

A two-relay line circuit provides indications of the possible conditions of the associated telephone or telecommunications line - (1) At rest; (2) Line requesting service; (3) Line in use; and (4) Line lockout. In this latter condition, the circuit is balanced. Before the circuit releases from a held condition, a final check is made to prevent improper release of the circuit. Of the two relays, one is a two-winding relay, one is a three-winding relay and neither requires slow-to-release characteristics.

3 Claims, 1 Drawing Figure

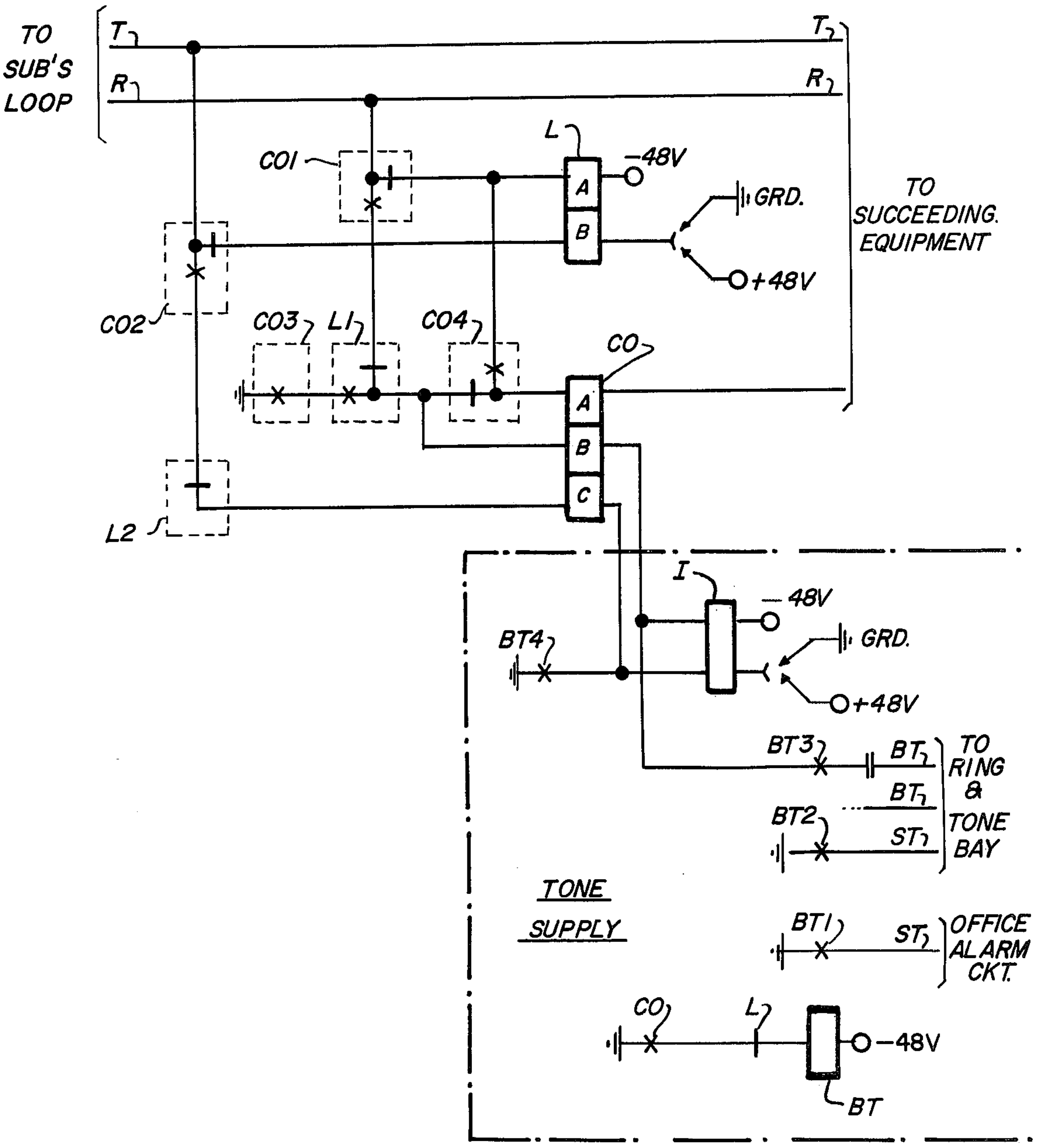
TO SUB'S LOOP
T
R
T
R
CO1
L
-48V
A
B
GRD.
+48V
TO SUCCEEDING EQUIPMENT
CO2
CO3
L1
CO4
CO
A
B
C
L2
I
-48V
GRD.
+48V
BT4
BT3
BT
BT
BT2
ST
TO RING & TONE BAY
TONE SUPPLY
BT1
ST
OFFICE ALARM CKT.
CO
L
-48V
BT

TWO RELAY LINE CIRCUIT

BACKGROUND OF THE INVENTION

The present line circuit is an improvement over the line circuit shown by U.S. Pat. No. 3,529,098 issued Sept. 15, 1970 to S. H. Chapman.

In that circuit, two relays are provided to respond to the conditions applied by or to the line, the line relay being a three-winding relay in both embodiments, both unbalanced and balanced line embodiments. Where a resistive balance is applied to a line, two three-winding relays are provided. Timing plus the closing of a contact in the marker or common control is necessary to release the line relay to a lockout condition.

Most current commercial circuits use three relays, adding to the cost, space and power requirements. These three relays include one relay for seizure, one for cut-off and the third for lockout, and many require slow-to-release characteristics which add to the cost of the line circuit.

SUMMARY OF THE INVENTION

Where the line circuit is unbalanced in both the seizure and lockout conditions, any AC induction present on the line will cause a loud hum on the line to the subscriber. This hum may mask the busy tone in a lockout condition. An unbalanced condition is defined as having a solid ground on one lead or different resistances to battery and to ground relative to the subscriber loop.

The present circuit provides a two relay line circuit with lockout, the two relays presenting a balanced condition to the line in both seizure and lockout conditions, a balanced condition being defined as having an impedance balance in both leads of the subscriber's loop to both battery and ground, so the line loop will not be susceptible to stray AC currents.

It is an object of the invention to provide an improved two-relay, balanced line circuit with lockout.

It is a further object of the invention to provide a two-relay line circuit in which the condition of the line loop is tested automatically on release of the office connection for a lockout condition, the testing not requiring relays with slow-to-release characteristics or common control functions.

Other objects, features and advantages of the invention may be apparent from the following description viewed in conjunction.

BRIEF DESCRIPTION OF THE DRAWING

The single drawing is a schematic circuit diagram of my invention.

DETAILED DESCRIPTION OF THE DRAWING

In the drawing, I show a pair of leads, T and R, leading at one end to the subscriber loop (not shown) in the known fashion. These tip and ring leads pass through the line circuit and are connected at their other end to the succeeding exchange equipment of any known electromechanical type.

Within the circuit are two relays, the line relay and the cut-off relay C.O. The line relay has two windings designated the A and B windings, both of approximately the same resistance. The C.O. relay has three windings designated A, B and C with the B and C windings of approximately identical resistances.

The L relay has two sets of contacts labeled L1 and L2, one being a break-make combination, and the other being a break contact, and has contacts controlled by it in the tone control circuit. The CO relay has four contact sets, CO1 through CO4 with contact sets CO1, CO2 and CO4 being break-make combinations, and CO3 being a make contact set, in addition to contacts within the tone control circuit.

A tone supply circuit is shown which is common to a plurality of line circuits. In the idle condition, both the L and CO relays are normally released.

The line circuit will work up to 1900 ohms at full float voltage of up to 52 volts D.C. with ground connected to the G terminal or from 1900 to 4500 ohms at full float voltage and +50 VDC connected to the G terminal.

When the subscriber wishes to initiate a call, he lifts his receiver off hook, which places a short or closed loop across the T and R leads at the subscriber's line. This closed loop operates the L relay over a path from the G terminal, B winding of the L relay, closed contacts CO2, T-R, loop, closed contacts CO1, and A winding of relay L to battery. The L relay in operating, prepares a lock path to the CO relay via contacts L1, closes a path (not shown) to indicate to the central marker that this line is initiating a call.

When the central marker has identified the line, it will proceed to set up crosspoints from the line to a register and will place ground on the C lead from the succeeding equipment. This ground will operate the CO relay, via its A winding, contacts CO4 and the B winding of CO relay to battery at the I relay in the tone supply.

The CO relay in operating will transfer the C lead ground from its A winding to the A winding of the L relay over contacts CO4 to hold both L and CO operated as long as there is ground on the C lead. Operation of the CO relay places a secondary holding ground back on the B winding of CO via contacts CO3 and L1; removes the T and R leads from the L windings at contacts CO1 and CO2, and opens paths (not shown) to remove the demand from the Central Marker of the succeeding equipment in a well-known manner.

The line will now stay in this cut-through state with both the L relay and C relay operated as long as there is a ground on the C lead from the succeeding equipment.

When the central marker receives a dialed telephone number that relates to the line it will suitably identify the location which corresponds to this line.

When the central marker has determined the line location, it will reset the calling line to this line (the called line). The Central Marker, in resetting the call, will test the C lead to the succeeding equipment for the battery via the A and B windings of the CO relay and then place ground on the C lead.

The ground on the C lead will operate the CO relay via its A and B windings and closed contacts CO4, and after the CO relay operates, will operate the L relay via the A winding of CO, the operated contact CO4 and the L relay A winding.

In either of the above operations, if the succeeding equipment removes the ground from the C lead after both L and CO relays have operated, the L relay will release due to removal of its hold ground. The CO relay will remain operated while L is releasing due to the secondary hold path from ground and contacts CO3, L1, and the B winding of the CO coil to battery through the I relay in the tone supply.

The L relay in releasing will connect the subscriber T and R to the respective B and C windings of the CO relay via contacts L1 and L2 having returned to their normal condition and contacts CO1 and CO2 in their operated condition. If the subscriber is still off-hook, then the CO relay will be held operated, thus placing the line circuit in a lockout state which will stay this way until the subscriber goes on hook (hangs up). The line is in a balanced condition due to equal resistance from the subscriber telephone to both battery and ground on its respective tip and ring leads.

With the CO relay operated and the L relay normal, the BT relay shown within the tone control circuit will operate to close contacts BT1-BT4 in the tone supply and connect the busy tone to the line to indicate a busy to the subscriber, and will ground the ST lead at contacts BT1 to indicate a line circuit in a permanently held condition.

In this condition, the circuit to the subscriber line is balanced with the B and C windings of the CO relay in series with the line loop. This path may be traced from ground or +48 volts at the lower winding of the I relay in the tone supply, the C winding of the CO relay, contacts L2 at normal, closed contacts CO2 to the T lead, and from the R lead through closed contacts CO1, contacts L1 in their normal condition, B winding of the CO relay, the upper winding of the I relay and −48 volts.

With relay L restored, and the CO relay operated, the BT relay shown in the tone supply operates return busy tone to the subscriber loop. With the line balanced due to the like resistances of the B and C windings of the CO relay hum and noise to the line loop is minimized.

The subscriber upon going on hook will release the CO relay and the line circuit will be idle.

It should be noted that the present line circuit checks for lockout on each release of the L relay, as follows:

Ground is removed from the C lead due to release of the succeeding equipment, the L relay releases first, CO relay remains operated over its secondary hold path through the B winding and contacts L1 (operated) and contacts CO3 (operated) until after the L relay releases. The CO relay windings B and C are switched by the L relay release to a condition in which the B and C windings of the CO relay test the line loop over contacts CO2 and CO1. If the T and R leads are shorted or remain looped, then the CO relay will remain operating, indicating a lockout condition. If the loop across the T and R leads is open, the path to the B and C leads is opened, then the CO relay will release and the line circuit will be idle.

By this approach, I have provided a two-relay line circuit, with a balanced condition on the line during lockout while omitting the need for slow-to-release relays or common control action. The subscriber line is tested for the need for lockout on each release of the succeeding equipment of the exchange.

I claim:

1. A line circuit for an automatic telephone system comprising a first and second multiple winding relay, said relays being released during normal conditions, said line circuit including a path for operating said first relay over a first winding responsive to a closed loop condition on a line individual to the line circuit, means for operating said second relay responsive to closure of a path to said line circuit, means for maintaining said second relay operated over a path through contacts of said first relay, means responsive to a lockout condition for releasing said first relay and for maintaining said second relay in an operated condition over a path through said second relay following release of said first relay and restoration of said contacts of said first relay, said second relay operative to test said line for continued closed loop condition after release of said first relay, wherein the path for originally operating said second relay includes two windings of said second relay, and a path for maintaining said second relay operated includes two windings of said second relay in series with the line loop.

2. A line circuit as claimed in claim 1, wherein said second relay includes three windings of which said last-mentioned two windings and a third winding are separate windings of said relay.

3. A line circuit as claimed in claim 1, wherein said last-mentioned second relay maintaining path includes one of said two windings of said second relay.

* * * * *